United States Patent
Wei et al.

(10) Patent No.: US 12,219,415 B2
(45) Date of Patent: *Feb. 4, 2025

(54) ANCHOR BASE STATION, SLAVE CELL AND USER EQUIPMENT

(71) Applicant: Sony Group Corporation, Tokyo (JP)

(72) Inventors: Yuxin Wei, Basingstoke (GB); Hideji Wakabayashi, Basingstoke (GB); Shinichiro Tsuda, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 17/220,942

(22) Filed: Apr. 2, 2021

(65) Prior Publication Data
US 2021/0227433 A1   Jul. 22, 2021

Related U.S. Application Data

(63) Continuation of application No. 16/097,840, filed as application No. PCT/EP2017/057626 on Mar. 30, 2017, now Pat. No. 10,972,951.

(30) Foreign Application Priority Data

May 10, 2016   (EP) ..................................... 16168961

(51) Int. Cl.
*H04W 36/00* (2009.01)
*H04L 5/00* (2006.01)
(Continued)

(52) U.S. Cl.
CPC ......... *H04W 36/0088* (2013.01); *H04L 5/005* (2013.01); *H04W 16/32* (2013.01);
(Continued)

(58) Field of Classification Search
None
See application file for complete search history.

(56) References Cited

U.S. PATENT DOCUMENTS 9,357,487 B2 * 5/2016 Jung ..................... H04L 5/0057
11,743,874 B2 * 8/2023 Shin ........................ H04L 5/001
370/329
(Continued)

FOREIGN PATENT DOCUMENTS

WO   WO-2012079476 A1 *  6/2012  ............. H04L 5/001
WO   2012/123616 A1      9/2012
(Continued)

OTHER PUBLICATIONS

Intel Corpporation, (Uk) Ltd., "Scell activation/deactivation MAC Control Element," R2-104027, 3GPP TSG RAN WG2 Meeting #70bis, Stockholm, Sweden, Jun. 28-Jul. 2, 2010, pp. 1-3.
(Continued)

*Primary Examiner* — Kodzovi Acolatse
(74) *Attorney, Agent, or Firm* — XSENSUS LLP

(57) ABSTRACT

A mobile telecommunications system anchor base station for a mobile telecommunications system has at least one anchor cell and at least one slave cell which is associated with the anchor cell. The anchor base station has circuitry which is configured to activate or deactivate the slave cell, based on a service requirement received from at least one user equipment.

17 Claims, 4 Drawing Sheets

(51) Int. Cl.
*H04W 16/32* (2009.01)
*H04W 24/02* (2009.01)
*H04W 24/08* (2009.01)
*H04W 24/10* (2009.01)
*H04W 72/0453* (2023.01)
*H04W 84/04* (2009.01)

(52) U.S. Cl.
CPC ........... *H04W 24/02* (2013.01); *H04W 24/08* (2013.01); *H04W 24/10* (2013.01); *H04W 36/13* (2023.05); *H04W 72/0453* (2013.01); *H04W 36/00838* (2023.05); *H04W 84/045* (2013.01)

(56) References Cited

U.S. PATENT DOCUMENTS

| | | |
|---|---|---|
| 2010/0246527 A1 | 9/2010 | Montojo et al. |
| 2011/0116467 A1* | 5/2011 | Jung ................ H04W 52/0225 370/329 |
| 2012/0307869 A1 | 12/2012 | Charbit et al. |
| 2013/0176952 A1* | 7/2013 | Shin ...................... H04L 5/0098 370/329 |
| 2014/0056278 A1* | 2/2014 | Marinier ............. H04W 72/044 370/330 |
| 2014/0079011 A1 | 3/2014 | Wiberg et al. |
| 2014/0226638 A1* | 8/2014 | Xu ................... H04W 74/0833 370/336 |
| 2014/0307638 A1* | 10/2014 | Zacharias ........... H04W 72/541 370/329 |
| 2015/0334730 A1* | 11/2015 | Wakabayashi .......... H04L 5/006 370/329 |
| 2016/0165627 A1* | 6/2016 | Uemura .................. H04L 5/001 370/336 |
| 2017/0142618 A1 | 5/2017 | Hahn et al. |
| 2017/0290015 A1* | 10/2017 | Xu .................... H04W 72/0453 |
| 2018/0242211 A1 | 8/2018 | Chen et al. |
| 2019/0074944 A1* | 3/2019 | Kishiyama ............ H04W 72/20 |

FOREIGN PATENT DOCUMENTS

| | | | |
|---|---|---|---|
| WO | WO-2013025547 A2 * | 2/2013 | ........... H04B 7/2612 |
| WO | 2013/150344 A1 | 10/2013 | |
| WO | WO-2017194245 A1 * | 11/2017 | ............. H04L 5/005 |

OTHER PUBLICATIONS

International Search Report and Written Opinion for International Application No. PCT/EP2017/057626, mailed Jul. 6, 2017.

* cited by examiner

ANCHOR BASE STATION, SLAVE CELL AND USER EQUIPMENT

CROSS-REFERENCE TO RELATED APPLICATIONS

This is a continuation of U.S. application Ser. No. 16/097,840, filed Oct. 31, 2018, which is a National Stage Application based on PCT/EP2017/057626, filed Mar. 30, 2017, and claims priority to European Patent Application No. 16168961.7, filed on May 10, 2016, the entire contents of each of which are being incorporated herein by reference.

TECHNICAL FIELD

The present disclosure generally pertains to an anchor base station, a slave cell and a user equipment for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

The candidate for providing the requirements of 5G is the so called Long Term Evolution ("LTE"), which is a wireless communication technology allowing high-speed data communications for mobile phones and data terminals and which is already used for 4G mobile telecommunications systems.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, deal with features and methods which are already defined in the LTE and LTE-A standard documentation.

5G technologies will allow a concept of a so called "virtual cell" or "local cell" or the like. In this concept a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been made in accordance with introduction of the IP Multimedia System (IMS) for LTE, and a physical separation between control plane and user plane has been proposed as a possible solution for 5G. Since requirements for the control plane should be basically robustness and wide coverage so as to maintain the service continuity, a macro or anchor base station should provide a link to the control plane. On the other hand a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE in the function as a virtual cell should be able to take over responsibilities, which are typically carried out, for example, in a base station, or eNodeB (Evolved Node B) as it is referred to in LTE (the eNodeB is the element in the evolved UTRA of LTE, the UTRA being the UMTS Terrestrial Radio Access). Such responsibilities which are envisaged to be performed in the UE as a virtual cell, are, for example, radio resource management, radio resource control ("RRC"), connection control, etc. Hence, it is not solely relied on the eNodeB or a small cell to relay data and to organize the local network, but such functions are shifted to the UE functioning as a virtual cell. The existence of such intermediate nodes of virtual cells in the network are expected to offload signaling overhead from the eNodeB, to allocate radio resource efficiently, etc.

However, for such requirements of future 5G technologies the signaling features and methods as being defined so far for LTE(-A) might be not optimal and, thus, it is generally desirable to improve known signaling and messaging methods.

SUMMARY

According to a first aspect, the disclosure provides a mobile telecommunications system anchor base station for a mobile telecommunications system including at least one anchor cell and at least one slave cell being associated with the anchor cell, the anchor base station comprising circuitry being configured to activate or deactivate the slave cell, based on a service requirement received from at least one user equipment.

According to a second aspect, the disclosure provides a slave cell being established by a slave base station and being connected to an anchor base station in a mobile telecommunications system, the mobile telecommunications system comprising the anchor base station, the anchor base station being configured to communicate with at least one user equipment and at least one further slave cell, the at least one further slave cell being configured to communicate with at least one user equipment and the anchor base station, the slave cell comprising circuitry being configured to activate or deactivate an extant carrier, based on a service requirement.

According to a third aspect, the disclosure provides a user equipment being connectable to at least one anchor base station and at least one slave cell of a mobile telecommunications system, the mobile telecommunications system comprising the anchor base station being configured to communicate with at least one user equipment and at least one slave cell, the at least one slave cell being established by a slave base station and being configured to communicate with at least one user equipment and the anchor base station, the user equipment comprising a circuitry being configured to receive a carrier segment activation command or deactivation command.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
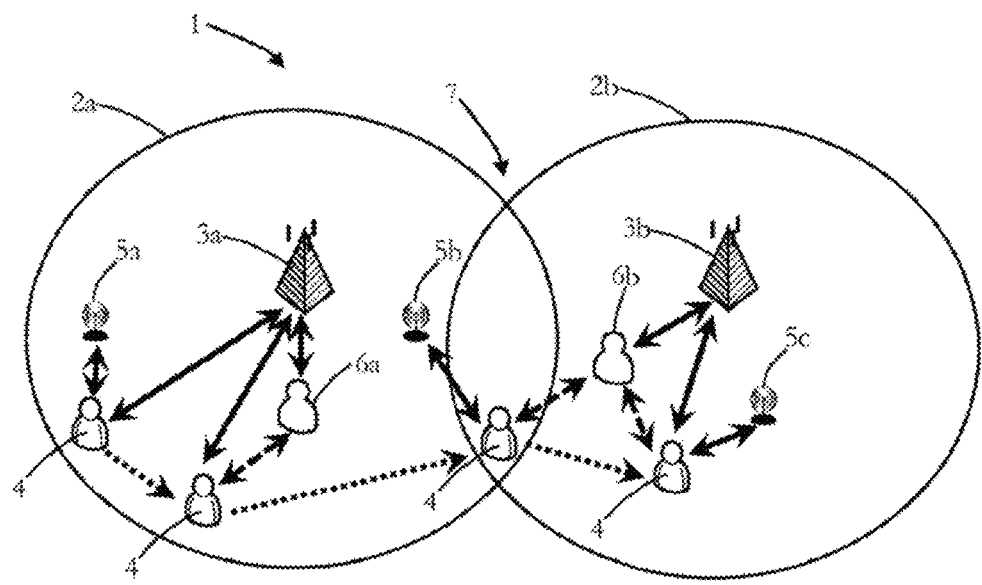
FIG. 1 illustrates a radio access network with anchor and slave base stations.

Before a detailed description of the embodiments under reference of FIG. 1 is outlined, general explanations are made.

The following description will exemplary refer to LTE (Long Term Evolution) technology, in order to explain the embodiments of the present disclosure. However, the skilled person will appreciate that the present disclosure is not limited to LTE. Moreover, although the present description generally refers to "LTE", the skilled person will appreciate that "LTE" shall cover also more advanced versions of LTE, such as LTE-A (LTE Advanced), LTE-B or New Radio (known as 5G) which is not yet standardized, but under development, etc. All those versions are referred to as "LTE" in the following.

As mentioned in the outset, 5G technologies will allow a concept of a so called "virtual cell" or "local cell" or the like. In this concept a cell is served by a user equipment ("UE"), e.g. a mobile phone, a smartphone, a computer, tablet, tablet personal computer or the like including a mobile communication interface, or any other device which is able to perform a mobile telecommunication via, for example, LTE (-A), such as a hot spot device with a mobile communication interface. In short the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

As also mentioned in the outset, for the 5G technologies it is envisaged that a UE in the function as a virtual cell or intermediate node should be able to take over responsibilities, which are normally executed in a base station (eNodeB), e.g. radio resource management, radio resource control (RRC), connection control, etc., instead of solely relying on an eNodeB or small cell. The UE in the function as a virtual cell or intermediate may not only relay data but may also organize the local network. The existence of such intermediate nodes in the network may help to offload signaling overhead from the eNodeB, to allocate radio resource efficiently, etc.

In 5G discussions, a user or UE centric approach is under discussion, which focusses on the user or UE performance improvement and not on the conventional cell centric architecture. In a user centric architecture, multi-connectivity may be provided for each user, in order to "track" the user and in order to fulfil user demands independent from time and location, e.g. anytime and anywhere.

With the usage of a virtual cell or intermediate node more dynamic and efficient user centric operations for end users may be possible. Hence, in the present disclosure, user or UE centric operations with a virtual cell or intermediate node are discussed.

When user centric operations are supported in LTE, the following issues or challenges may be addressed:

A first issue may be, how a proactive activation/deactivation of an intermediate node, such as a virtual cell, may be achieved in an on-demand manner and which criteria may be adopted to perform the activation/deactivation operation.

A second issue may be, how a coordinated set for each user may be coordinated in order to perform a user-specific coordinated set and the uplink and downlink may be decoupled from each other in order to establish different coordinated sets for uplink and downlink of each user, especially in cases where the uplink and downlink performance differs (to a larger extent).

A third issue may be, how interferences between virtual cells or intermediate nodes as well as between access link and backhaul link may be coordinated.

The existence of a virtual cell may support in some embodiments, more dynamic and efficient user centric operations in the network.

Consequently, some embodiments pertain to a mobile telecommunications system anchor base station for a mobile telecommunications system. The mobile telecommunications system may be based on the principles of the LTE technology, as mentioned above. The mobile telecommunications system includes at least one anchor cell, being established e.g. by the anchor base station, and at least one slave cell being associated with the anchor cell and being established, for example, by a slave base station. As mentioned herein, the anchor cell may be a macro cell or the like. The slave cell may be a small cell, local cell, virtual cell or the like, which is established by a slave base station, e.g. an intermediate node or the like, which may be implemented on the basis of a UE.

The anchor base station can be based on the known eNodeB of LTE, as one example. The anchor base station comprises circuitry being configured to activate or deactivate the slave cell, based on a service requirement received from at least one user equipment. Hence, the slave cell can be selectively activated or deactivated.

The circuitry may be configured to communicate with at least one user equipment, at least one slave base station and/or with at least one slave cell, and/or at least one virtual cell, as described herein.

As mentioned, the user equipment may be, for example, a mobile phone, smartphone, a computer, tablet, tablet personal computer or the like including a mobile communication interface, or any other device which is able to perform a mobile telecommunication via, for example, LTE, such as a hot spot device with a mobile communication interface, etc.

The service requirement may be received from a single UE or a group of UEs, such that the slave cell can be selectively activated or deactivated for a single UE or a group of UEs.

The service requirement may include application level information. Hence, the slave cell may be activated for a specific service requirement which may be defined in or determined on the basis of the application level information received from the single UE or from the group of UEs.

The circuitry may be further configured to send a one-shot activation command. Thereby, a fast and simple activation of respective resources, e.g. carriers, is possible in some embodiments. The circuitry may be configured to send the one-shot activation command to the slave cell or a group of UEs.

The circuitry may be further configured to activate or deactivate an extant carrier. The extant carrier may be, for example, a sporadic carrier or carrier segment. The extant carrier may be a carrier segment which is left over, e.g. since it is not-used or unallocated, either static or temporarily.

The extant carrier may be activated or deactivated by the circuitry for a single UE or a group of UEs in the slave cell. Thereby, unused resources can be selectively used for a single UE or a group of UEs.

The circuitry may be further configured to select a coordinated set based on at least one of link quality, matched service requirement, service provider, resources availability and interference level. Thereby, an optimized combination of anchor base stations, slave base stations, etc. may be selected.

The circuitry may be further configured to perform handover on the basis of a relayed handover message being transmitted to the slave cell and being relayed by the slave cell.

Some embodiments pertain to a slave cell (slave base station). The slave cell is established by a slave base station and it is connected to an anchor base station in a mobile telecommunications system, such as discussed above and herein. The mobile telecommunications system comprises the anchor base station, wherein the anchor base station is configured to communicate with at least one UE and at least one further slave cell. The at least one further slave cell is configured to communicate with at least one UE and the anchor base station. The slave cell comprises circuitry, which is configured to activate or deactivate an extant carrier, based on a service requirement, as already discussed above.

The service requirement may include application level information, as discussed above.

The extant carrier may be activated or deactivated for a single UE or for a group of UEs, as discussed above.

The extant carrier may include a sporadic carrier and/or a carrier segment, as discussed above.

The activated carrier segment may be located within a primary carrier. Thereby, a carrier segment of the primary carrier, which is not used, can be allocated to a single UE of group of UEs. The activated carrier segment may be associated with a primary carrier. For example, the primary carrier may have the control over the carrier segment.

The circuitry may be further configured to send a reference signal on activated resource blocks to a specific UE or a group of UEs. This reference signal may be sent with a pre-defined periodicity. The circuitry may be further configured to send a measurement configuration on activated resource blocks to a specific user equipment or a group of user equipments. The activated resource blocks may be associated with a primary carrier or may be located within a primary carrier or the activated resource blocks may be associated with an extant carrier, e.g. a sporadic carrier and/or a carrier segment. The circuitry may be further configured to perform a control plane handover. The circuitry may be further configured to relay a relay handover message received from the anchor base station. The circuitry may be further configured to select another slave cell for handover on the basis of a measurement report received from a user equipment.

Some embodiments, pertain to a user equipment being connectable to at least one anchor base station and at least one slave cell of a mobile telecommunications system, as described herein and in particular as described above. As mentioned, the user equipment may be, for example, a mobile phone, smartphone, a computer, tablet, tablet personal computer or the like including a mobile communication interface, or any other device which is able to perform a mobile telecommunication via, for example, LTE, such as a hot spot device with a mobile communication interface, etc. The mobile telecommunications system comprises the anchor base station which is configured to communicate with at least one UE and at least one slave cell. The at least one slave cell is established by a slave base station and is configured to communicate with at least one UE and the anchor base station. The UE comprises a circuitry which is configured to receive a carrier segment activation command or deactivation command, e.g. sent from the anchor and/or slave base station. Hence, the carrier segment activation command or the carrier segment deactivation command may be received from the slave cell or the anchor base station.

The circuitry may be further configured to measure and report a channel quality only on activated resource blocks. Thereby, signaling can be reduced, since it is only reported on activated resource blocks.

The circuitry may be further configured to receive a UE group specific reference signal only on activated resource blocks. Thereby, the UE may save power, since it is only required to receive the reference signal on the activated resource blocks.

Although herein and in the following features are described which are to be performed by a circuitry, the same features can be part of a method, which can be performed, for example, by a circuitry, such as the circuitry of the anchor base station, the circuitry of a slave base station (see description further below), the circuitry of a virtual or slave cell (see further below), and/or the circuitry of a user equipment (see further below).

The following description is divided into three sections for discussing embodiments of the present disclosure.

Returning back to FIG. 1, there is illustrated a RAN (Radio Access Network) 1, wherein in this case two (macro) cells 2a and 2b are illustrated which are both served and established by a base station 3a and 3b, respectively. The base stations 3a and 3b are basically an eNodeB type base station except for the principles described herein and they are an anchor base station as described herein and, consequently, the cells 2a and 2b are anchor cells in the sense as described herein.

A user 4, i.e. a UE 4, is illustrated which travels around and starts in the coverage of the cell 2a on the left side of FIG. 1 and ends in the cell 2b of the right side of FIG. 1.

During this travel and depending on its position, the UE 4 communicates with different entities, such as a hot spot 5a in the left cell 2a, establishing a small cell, and another UE 6a, which is an intermediate node in the sense as described herein and which establishes a virtual cell (also described as a slave cell herein). The UE 4 can directly communicate with the base station 3a or it can communicate indirectly over the UE 6a, which serves as an intermediate node, with the base station 3a. In a region 7, where the left cell 2a and the right cell 2b overlap, the UE 4 communicates with a further hot spot 5b of the left cell 2a and simultaneously with a UE 6b of the right cell 2b serving as an intermediate node. In its last right position as illustrated in FIG. 1, the UE 4 communicates with a hot spot 5c, communicates directly with the base station 3b, and communicates also over the intermediate node UE 6b establishing a virtual cell (or slave cell) with the base station 3a.

In the following, embodiments of the disclosure will be discussed which address the abovementioned issues which arise when the discussed traveling of the UE takes place.

A first section of the following description pertains to different purposes and different levels of the activation and deactivation of a slave cell, e.g. virtual cell. A second section pertains to the application level transmission/reception coordinated set for the UE, wherein it is further distinguished between uplink and downlink. A third section pertains to solutions to tackle the UE mobility in user-centric operations.

In the following description, embodiments will be described which pertain to a virtual cell (UE) as an example of a slave cell (slave base station), without limiting the present disclosure to virtual cells, and which pertain to an eNodeB as an anchor base station, without limiting the present disclosure to an eNodeB as an anchor base station. Of course, the description of the virtual cell pertains also to the slave base station, e.g. an intermediate node or UE, which established the virtual cell.

First Section—User Centric Slave (Virtual) Cell Activation/Deactivation

The slave cell (e.g. small cell, local cell, pico cell, virtual cell), for example, established by the UE 6a or 6b, could be triggered for a group of UEs or for a single UE, such as UE 4, depending on different scenarios.

First Scenario

In a first scenario the slave cell is activated for a group of UEs. The group of UEs may be defined by different criteria. For example, the UEs which belong to the same hot spot and which may lack enough radio resources may form a group of UEs. Also UEs having an identical or similar application content demand may form a group of UEs. Furthermore, UEs having identical or similar service requirements may form a group of UEs.

In order to implement such user group/application level activation, the UEs may send information being representative of their service requirements, such as the application level information e.g. application type, application content identifier, QoS requirements, application duration, UE priority, etc. This information being representative of their service requirements may be sent, for example, in the discovery message on a PC5 link or in a scheduling request on the Uu link, such that it can be received by a base station (e.g. an anchor base station) or received by a slave base station.

As generally known, the PC5 link is a link between two UEs and the Uu link is a link between a UE and the E-UTRAN (evolved UMTS Terrestrial Radio Access).

The virtual cell (slave base station) will gather such information and identify the necessity (e.g. the amount of UEs that are beyond a certain threshold, the UEs which are listed as high priority) to trigger themselves to participate in a group of UEs.

In alternative embodiments, the eNodeB will collect such information sent from the UEs and trigger some virtual cells for a group of UEs.

As another example, it is possible that the virtual cell will adjust the resource allocations or switch/handover of a group of UEs to another virtual cell after its activation. The virtual cell may be activated by default in the hot spot area. But certain groups of UEs may have special requirements e.g. on the provided services. After collecting such information, the virtual cell will adjust the resource allocations for such groups of UEs and/or will switch/handover groups of UEs to a new virtual cell/small cell which can fulfil their requirements.

Second Scenario

In a second scenario, a virtual cell is activated for a single UE, such as UE 4 of FIG. 1. In other words, in such embodiments, it is allowed to trigger a virtual cell only for a single UE. At least two methods are applicable in the embodiments.

According to a first method, the virtual cell is in a sleep state, but it will broadcast system information which contains information about provided services or the virtual cell will send a discovery message that contains respective information about provided services. After receipt of such an information, the UE (in idle state or connected state within the virtual cell) will decide whether to send an activation request message to the virtual cell or not.

According to a second method, the UE will send a discovery message that contains the service requirement, for example, QoS related information. The virtual cell which receives the message will decide to send a respective reply message or not. As an alternative, the eNodeB may receive such information and may designate a respective virtual cell to send a reply message to the UE.

In the activation/deactivation operation in the general known carrier aggregation, the operation is typical carrier-wise, which means that the whole carrier resources will be triggered without considering the real application scenarios.

For 5G and, thus, also in some embodiments, the resources which are activated/de-activated may differ.

In the following, different scenarios which may be provided in some embodiments are discussed.

In a first scenario, the whole carrier is activated (or deactivated). In this case, the whole carrier resources of a virtual cell will be triggered. This may apply, for example, for cases where the virtual cell has to provide one or more services for a larger group of users, e.g. in the hot spot, or where the virtual cell has to provide a high volume data transmission. Both cases, i.e. the large group of users (UEs) and the high volume data transmission may be decided on the basis of a respective threshold value, which may be defined in advance, may be calculated, etc. In contrast to the general known activation of the operation in carrier aggregation, the virtual cell may deploy several (different) carriers including mmWave, conventional cellular carrier in a lower band, unlicensed carriers, etc. The virtual cell may decide which carriers are to be activated on the basis, for example, of an information exchange with the serving eNodeB and/or a neighboring eNodeB as well as among neighboring virtual cells, the user (UE) and/or service characteristics, etc. The virtual cell may have the responsibility to decide how to allocate the respective resources to each user (UE).

For example, if the user (UE) density is large and/or is concentrated in a small area, and/or the data volume is quite large, the virtual cell may decide to activate an mmWave carrier.

As another example, the virtual cell may decide to activate an unlicensed carrier, if the service is sporadic, but the user (UE) number is relatively large.

In a second scenario, only partial resources are activated, i.e. only a part of the resource of the virtual cell will be activated for a certain group of UEs or a single UE. The resources, which are not activated, i.e. which are in a de-activated state, will remain in "sleep" state, and, thus will not cause interferences with other UEs. In contrast to normal DRX (discontinuous reception), where the carrier is typically not changed, in the second scenario, the sporadic carrier may change. The "sleep mode" of the de-activated resources may be notified to the UE(s). Then, for example, on the deactivated resources, reference signals may be transmitted with reduced (pre-defined) periodicity compared to activated resources, or alternatively, no reference signals are transmitted on the deactivated resources. The UEs may skip the monitoring of the reference signal for the de-activated resources, in order to reduce energy consumption. In some embodiments, the reference signal will be transmitted in an on-demand manner. This can be done, as mentioned above, also in a manner that the reference signal is only transmitted in the activated resources on demand and/or that the reference signal is transmitted with reduced periodicity on the de-activated resources on demand.

The activation criteria for the resources may be traffic volume, coverage, interference, QoS, and/or group operation. Moreover, in some embodiments, there is a need to activate additional resources only for a certain group of UEs with special service requirements or the like. After activation of the additional resources, the power efficiency (e.g. throughput per Joule) and/or the spectrum efficiency (e.g. throughput per Hz) may be improved.

Although the aim of the partial resource activation is to allocate the partially activated resources to the end user (UE), the activation procedure of the partial resources is always performed before the dynamic scheduling. Hence, in some embodiments, the general procedure is configuration→activation→dynamic scheduling (in this order).

After the configuration, the UE may receive system information from the (virtual) cell but it cannot receive control data or transmit/receive data from the cell. There is also no PMI (Pre-coding Matrix Indicator), CQI (Channel Quality Indicator), RI (Rank Indicator) reporting (no CSI (Channel Status information) reporting).

After the activation, the UE could receive control data and transmit/receive data from the (virtual) cell. The CSI reporting may also be included.

Consequently, in some embodiments, only after a successful activation of (a part of) the resources, the dynamic scheduling will be performed. During the dynamic scheduling, it will be decided, which resource blocks will be allocated and to which UE they will be allocated.

In the known release carrier aggregation, the configuration and/or activation of the resources is UE specific. Hence, in known systems, once the carrier is activated, the UE has to do the measurement and/or CSI reporting on the whole carrier.

In contrast to this, in some embodiments, for the partial resource activation the characteristics may be summarized and may be implemented in some embodiments, as discussed below:

First, the control data and reference signal are transmitted only on the limited resources (e.g. the activated resources). For the UE(s) which receive the partial activation command, there will be no or only a reference signal having, e.g. a reduced periodicity, on the deactivated resources.

In the following, two examples are given on the basis of which criteria it may be decided which resources should be activated for a certain UE.

In a first example, the whole carrier will be activated, but the UE will report CSIs, based on measurements of the resources. Then, respective partial resources will be activated for certain UEs based on the measurements.

In a second example, the resources will be activated randomly for certain groups of UEs. As long as there is no measurement report which indicates bad link qualities on the activated resources, the activation of the respective activated resources will be kept. If from measurement reports it turns out that the channel quality is bad, a re-allocation will be performed, which then can be made, for example, random again. The resources for which a bad channel quality was determined, may not participate in the following random resource allocation.

Second, the UE(s) which receive the partial resource activation command may only perform measurements and CSI reporting on the activated resources.

Third, the activation/deactivation command along with which resources should be activated/deactivated may be semi-static/dynamic, e.g. through MAC CE or PHY layer signaling or by RRC signaling.

Fourth, the amount of activated resources may depend on, for example, service request, UE group size, etc.

Fifth, the partial resources activation may be user (UE)/user (UE) group specific. In such embodiments, a group specific reference signaling configuration is provided and this configuration is transparent to other groups. As an alternative, the different users/user groups may share the same set of resources with different sets of reference signals (e.g. based non-orthogonal multiplexing).

Summarizing, with this partial resources activation, the UE's load to measure the channel and to give respective feedback will be further decreased and, moreover, an on-demand reference signaling and control signaling may be realized on the basis of it.

In the following, under reference of FIGS. 2a-d, three embodiments for different kinds of partial resources are discussed. Such partial resources and their associated partial carriers are also referred to as extant carriers, since, typically, in some embodiments, these are carriers which are not used, and, thus, "extant" (or left over).

Figure 2A:
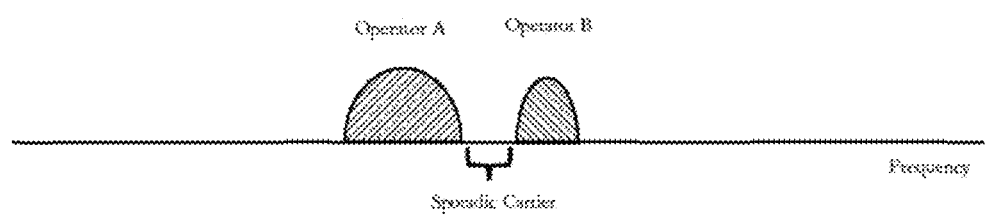
FIG. 2a illustrates a sporadic carrier.
Figure 2B:
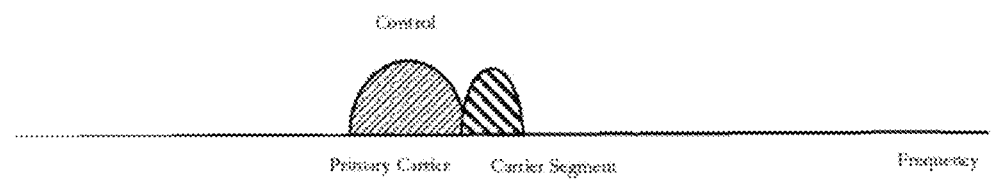
FIG. 2b illustrates a carrier segment.

In FIGS. 2a and 2b a sporadic carrier or carrier segment solution as example of extant carriers are illustrated which work with a primary carrier. Sporadic carrier refers in some embodiments to carriers which are sporadically available, while carrier segments refers in some embodiments more generally to segments of carriers which are available, either temporarily or static.

The virtual cell may configure several sporadic carriers or carrier segments or resource blocks. These carriers contain only limited bandwidth, e.g. one or two RBs, and may not be suitable for the macro/small cell to support a large number of users (UEs).

But, for a virtual cell which only supports a limited (small) number of users (UEs), sporadic carriers or carrier segments may be usable and may be easily deployable.

As can be taken from FIG. 2a, the frequency spectrum allocated by regulators to network operators, e.g. "Operator A" and "Operator B", may have unused band segments (see "sporadic carrier" in FIG. 2a). Such carrier segments can be (temporarily) allocated to a virtual cell such that the virtual cell can use it. As another example, such sporadic carriers and/or resource blocks are available in cases where the eNodeB divides the whole (available) spectrum into resource pools and between these resource pools, some leftover (extant) resource blocks exist. In some embodiments, even the resource pool can be treated as sporadic carriers or sporadic resource blocks.

In the embodiment of FIG. 2b, it is illustrated that the carrier segment can be used as working together with a primary carrier, which then has the control function. The primary carrier, which typically carries the control signaling, e.g. resource allocation, RRC, measurement configuration, feedback configuration, etc., is activated together or before the activation of a carrier segment. The node which configures and/or activates the primary carrier may differ from the node which configures and/or activates the carrier segment. For instance, the primary carrier is configured and/or activated by the macro eNodeB (anchor base station), whereas the carrier segment is configured and/or activated in the virtual cell (e.g. by the slave base station). In other embodiments, the primary carrier and the carrier segment are configured and/or activated in the virtual cell (e.g. by the slave base station). The carrier segment can be treated as an additional resource for data transmission.

Figure 2C:
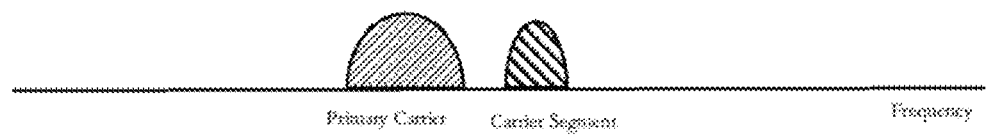
FIG. 2c illustrates a carrier segment independent from a primary carrier.

In FIG. 2c, an embodiment is illustrated, where the carrier segment works independent from the primary carrier.

The carrier segment may be activated with the signaling on the primary carrier or by a signaling independent from the primary carrier. The carrier segment in this embodiment carries the control signaling by itself, and, thus, does not need to rely on the primary carrier. The control signaling and reference signaling may be implemented in an on-demand manner.

Figure 2D:
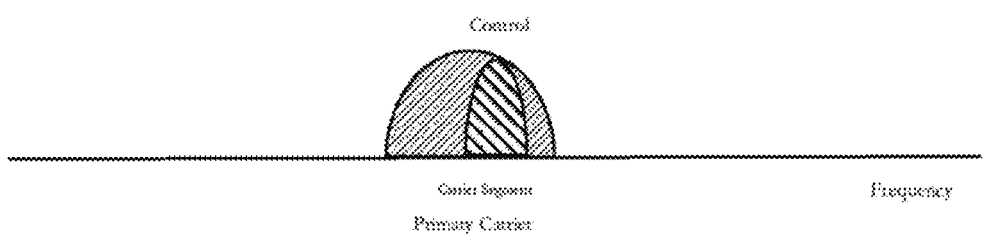
FIG. 2d illustrates a carrier segment which is part of a primary carrier.

FIG. 2d illustrates an embodiment, where resources within a primary carrier are used as a carrier segment.

As the activated resources (carrier segment) are located within the primary carrier they can only be activated by the primary carrier itself. The remaining resources could be deactivated or activated for other UEs/user groups. There will be a separate control signaling and reference signaling for the remaining resources.

In order to enhance the understanding of the difference between the carrier segment (extant carrier) and the known carrier aggregation which allocates carriers to users for increasing the data throughput, the following table summarizes the differences:

| Items | Sub-items | Carrier segment | Carrier aggregation |
|---|---|---|---|
| Reasons of activation/ deactivation | Reason of activation Criteria of activation/ deactivation | The necessity for virtual cell (VC) Traffic volume, coverage, interference, QoS, group operation, etc. | Large data volume handling for a specific UE Downlink buffer in the eNodeB, buffer status report from UE |
| Resource activation/ deactivation | Unit of activation/deactivation Size of activation/ deactivationr esource Effective area/ range of control Unit of resource control Duration of resource allocation What the resource can be reused for during deactivation | VC specific Suitable for VC VCs in the cell (and UEs in the VC) Carrier segment (multiple resource blocks which are suitable for VC) Sporadic carriers Fast signaling of activate/deactivate or one-shot For other VCs in the cell | UE specific e.g. 20 MHz suitable for cell The entire cell/UEs in the entire cell) Component carrier(s) Fast signaling of activate/deactivate For another UE in the cell |
| Resource scheduling during activation | RBs allocation during activation Scheduling signaling | Resource pool for group or UE specific scheduling from VC 5G control signaling or primary cell | UE specific scheduling from eNodeB SCell PDCCH or PCell PDCCH (cross-carrier scheduling) |
| Operation during activation | Cell-specific reference signals CQI/CSI | Not transmitted during deactivation Not transmitted during activation | Always transmitted regardless of activation Not transmitted during activation |

In the following three different types of embodiments are discussed of how to allocate the partial resources to a single UE or a group of UEs.

According to a first type of embodiment for allocation of partial resources, in the case of the virtual cell being allocated with several resource pools, for a certain group of UEs or single UE, only one resource pool will be allocated to the end users. The decision is made based on interference information, e.g. interference level indication on the resource blocks exchanged with the serving eNodeB, a neighbor eNodeB and/or with a neighbor virtual cell.

According to a second type of embodiment for allocation of partial resources, only certain resource blocks or subframes will be provided to users. This applies to the licensed and unlicensed bands. Especially for the unlicensed bands, for the resources that are not occupied by other UEs (listen before talk, LBT), the virtual cell will allocate the resource blocks opportunistically to the end users. The detection of occupied resources could be coordinated by the serving eNodeB, the virtual cell and/or the end-users together for achieving accurate results.

According to a third type of embodiment for allocation of partial resources, the eNodeB sends a so-called one-shot activation to the virtual cell or to the UEs within the virtual cell. The resource pool(s) is configured to the UEs by the virtual cell. A duplicated allocation of resource pool(s) is allowed among virtual cells under the same cell served by an eNodeB. The eNodeB sends control signaling, e.g. PDCCH (Physical Downlink Control Channel)/EPDCCH (enhanced PDCCH) with common search space or virtual cell-specific search space, to the UE for informing which UE (or which virtual cell) is allowed to send data. In some embodiments, this is a kind of time-division scheduling, but the units of control are the virtual cells rather than individual UEs. In some embodiments, this approach is suitable for small traffic where a large number of virtual cells is involved.

The detail of the whole process including one-shot activation is as follows:
1. Resource pool configuration
  1.1. eNodeB allocates the resource pool(s) to a virtual cell.
  1.2. The virtual cell configures the resource pool(s) to UEs under it (not activated yet).
  1.3. Likewise, eNodeB allocates the same resource pool(s) to another virtual cell.
  1.4. The virtual cell configures the resource pool(s) to UEs under it (not activated yet).
2. Scheduling Request (or buffer status)
  2.1. For uplink: UE sends the scheduling request to virtual cell for uplink data.
  2.2. The virtual cell sends the scheduling request to the eNodeB.
  2.3. For downlink: As an alternative for 2.2, the eNodeB is aware of arrival of data for downlink.
3. One-shot activation
  3.1. Direct: eNodeB directly sends the grant to UEs under the virtual cell with PDCCH/EPDCCH.
  3.2. Or as an alternative to 3.1, indirect via the virtual cell: eNodeB sends the grant to the virtual cell and the virtual cell sends the grant to UEs under it.
The grant information may include:
Designated virtual cell (ID)
Duration of activation (optional if configurable)
Designated resource pool (optional if more than one resource pool has been configured to VC)

The signaling of control information may use:
Check the common search space and read PDSCH (Physical Download Shared Channel) which could carry the grant information (all the UEs in the cell must read PDSCH).
Or: Virtual cell-specific search space (or virtual cell-specific RNTI (Radio Network Temporary Identity)) and read PDSCH which could carry the grant information (the UEs under the virtual cell need to read PDSCH).
4. Data transmission
  4.1. UE (or virtual cell) sends the data to virtual cell (or UE) during the period of grant.
5. Deactivation
  5.1. After the expiry of above grant duration, the resource is automatically deactivated.

The resource concept could be applied to a wider range in some embodiments, e.g. transmission power, antenna configuration etc.

Second Section—Coordinated Set Selection

The coordinated set is composed by the transmission/reception nodes (e.g. eNodeB, virtual cell, small cell) to send/receive data to/from the UE.

The coordinated set selection may be based on the following criteria:

First, it may be based on the link quality. Each UE will measure the reference signal quality e.g. RSRP (Reference Signal Received Power)/RSRQ (Reference Signal Received Quality), from the eNodeB and the virtual cell (if available). The UE may also measure the discovery signal quality and/or the synchronization signal quality of the PC5 link with the virtual cell. Then, the UE will feed back the link quality together with the identifier of potential transmission points to the eNodeB and/or to the virtual cell. The link quality includes both the access and backhaul link of the virtual cell. In the case of an extant carrier, in particular of a sporadic carrier, there may be no indication of the link quality present before its activation. After the extant carrier is activated, there will be a measurement report about the link quality of the downlink and the eNodeB may measure the link quality of the uplink.

Second, it may be based on matched service requirements and the service provider. Only the transmission node which is able to provide the guaranteed service quality e.g. QoS, will be selected as one of the transmission points. The application level information will be exchanged in the activation stage. It is possible that for different applications of one UE, the different coordinated sets will be selected. Furthermore, by considering the different priorities of each service, in the case of resource scarcity, the better transmission node, e.g. with sufficient good link quality, with less load, with more matched resources for the demanding services, or the like, will be selected for the services.

Third, it may be based on resources availability and interference level. The transmission point with available resources and which will fulfil the service requirements will be selected. At the same time, a transmission node which is mutually exclusive because of resource collision, e.g. causes heavy interferences to the on-going communication of other UEs, will not be selected in the coordinated set. The interference information and/or resources usage information of each resource block will be exchanged periodically/dynamically or on demand of other transmission nodes.

By considering the above discussed criteria, for example, together with a weighted average, multiple transmission points can be selected for each UE. In some embodiments, a central node is defined which makes such decisions, e.g. the serving eNodeB, while in other embodiments the decision is made on the basis of the coordination of each of the participating nodes. The notification of the coordinated set could be sent to the UE(s) in a central or distributed manner. In embodiments using the central approach, the eNodeB will notify the UE about all selected transmission point identifiers together with the specific resource allocation and/or supported application (in the case that different applications will have different coordinated sets).

For the downlink and uplink data, it is possible that different coordinated sets will be applied in some embodiments. For the downlink, the UE measures the link quality of the reference signal of every potential transmission point and feedbacks the measurement report. For the uplink, the virtual cell measures the link quality of the discovery signal, and together with the criteria listed above, the virtual cell sends the corresponding information to a central node, e.g. the serving eNodeB, to make the decision or, as mentioned above, the decision about the coordinated set for the UE uplink data transmission is made based on the coordination of each of the receiving nodes. As an example, the eNodeB may measure the link quality of the reference signal from the UE (if available) to make the decision of coordinated set for uplink.

Third Section—UE Mobility in User-Centric Operation

As the UE and the virtual cell may be mobile, as also discussed for FIG. 1 above, the multi-connectivity of UE illustrated in FIG. 1 may help to reduce the handover signaling and/or handover failures.

In the following three different types of embodiments are discussed.

A first type of embodiments pertains to the control/user plane separation. A logical separation between control plane and user plane has been made in accordance with introduction of the IP Multimedia System (IMS) for LTE, and a physical separation between control plane and user plane has been proposed as a possible solution for 5G. This separation into control plane cell and user plane cell may be made in a way, for example, that user data are handled over the user plane and signaling is handled over the control plane cell. The serving macro eNodeB (anchor base station) will be responsible for the handover, all the other small cells and/or virtual cells (slave base stations) will be responsible for the user plane data transmission. Hence, in this scenario, there is no handover within the control plane area. For the handover among the control plane area, the virtual cell may support a handover. For example, if two virtual cells are located within the coverage of adjacent cells, then with the assistance of these two virtual cells, UE(s) that is moving from one cell to the adjacent cell could make a handover by these two virtual cells.

A second type of embodiments pertains to a virtual cell relayed handover message. A drawback of control/user plane separation may be the so-called single node failure problem. Especially in a cell edge area, the receiving quality may be not sufficient or not satisfying. In some scenarios, a virtual cell may be located always near or neighboring to the serving eNodeB and the end user (UE). Then the handover command is transmitted from the serving eNodeB to the end user through the virtual cell, which, in some embodiments, compensates a bad direct link quality between the eNodeB and the UE. In the relayed handover message, all the information is provided by the serving eNodeB, while the virtual cell only relays the message. The relayed messages can be further extended to other control signaling e.g. RRC signaling.

A third type of embodiments pertains to a virtual cell assisted/controlled handover. In the case that the virtual cell finds a suitable candidate for the UE and coordinates with a potential target virtual cell, the source virtual cell may trigger the handover command to the UE instead of the serving eNodeB. After receiving the measurement report from UE, the source virtual cell will make the handover decision and send the handover request to the target virtual cell. Once the target virtual cell accepts the handover request, it will send an acknowledgement to the source virtual cell. Then the source virtual cell will send a handover command to UE. Then, as the UE may be in a multi-connectivity situation, where the UE may have several connections, for example, with a serving eNodeB, small cells or other virtual cells, the service continuity could be maintained.

Figure 3:
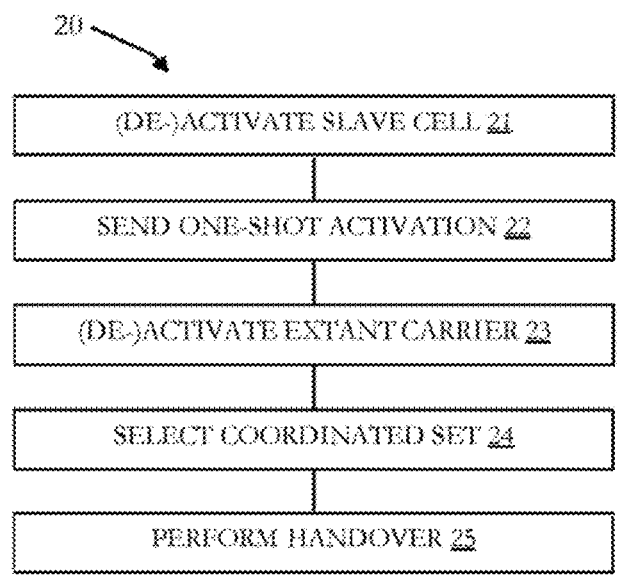
FIG. 3 illustrates a method to be performed by a base station.

In the following, a method 20 is discussed under reference of FIG. 3, which may be performed, in particular, by the circuitry of the anchor base station as described herein.

At 21, the slave cell is activated or deactivated, based on a service requirement received from at least one UE, as discussed above. The service requirement may be received from a single UE or from a group of UEs. As also discussed above, the service requirement may include application level information.

At 22, a one-shot activation command is sent for activation and allocation of resources to a UE, as discussed above. The one-shot activation command may be sent to the slave cell or a group of UEs.

At 23, an extant carrier is activated/deactivated, as discussed above. The extant carrier is activated or deactivated for a single UE or a group of UEs in the slave cell. The extant carrier may include a sporadic carrier and/or a carrier segment.

At 24, a coordinated set is selected based on at least one of link quality, matched service requirement, service provider, resources availability and interference level.

At 25, handover is performed on the basis of a relayed handover message being transmitted to the slave cell and being relayed by the slave cell.

The order of features 21-25 may be different in different embodiments and can be chosen freely. Moreover, other embodiments of the method may only include a part of the features 21-25.

Figure 4:
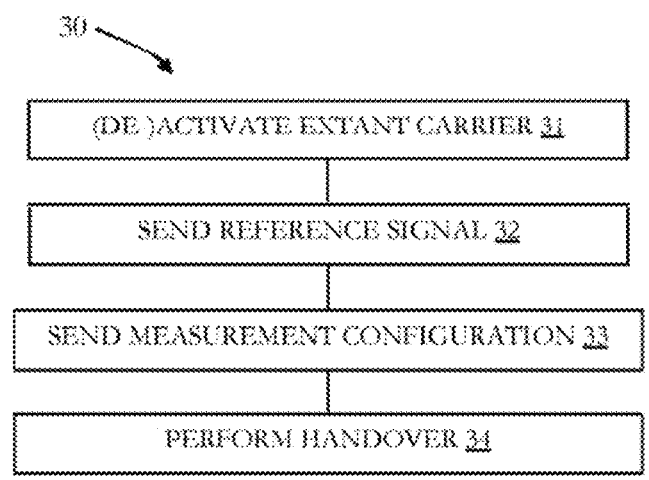
FIG. 4 illustrates a method to be performed by a slave cell.

In the following, a method 30 is discussed under reference of FIG. 4, which may be performed, in particular, by the circuitry of the slave cell or slave base station as described herein.

At 31, an extant carrier is activated or deactivated, based on a service requirement, as discussed above. The service requirement may include application level information. The extant carrier is activated or deactivated for a single UE or for a group of UEs, as discussed above. The extant carrier may include a sporadic carrier and/or a carrier segment, as discussed above. The activated carrier segment may be located within a primary carrier and it may be associated with a primary carrier, for example, it may be under the control of the primary carrier, as discussed above. As discussed above, the carrier segment may also be independent from the primary carrier.

At 32, a reference signal is sent on activated resource blocks to a specific UE or a group of UEs, as discussed above, wherein the reference signal may be sent with a pre-defined periodicity. As discussed above, the activated resource blocks are associated with a primary carrier or located within a primary carrier.

At 33, a measurement configuration is sent on activated resource blocks to a specific user equipment or a group of user equipments.

At 34, a handover is performed. As discussed, this may include a control plane handover, it may include to relay a relay handover message received from the anchor base station, and/or it may include to select another slave cell for handover on the basis of a measurement report received from a user equipment.

The order of features 31-32 may be different in different embodiments and can be chosen freely. Moreover, other embodiments of the method may only include a part of the features 31-32.

Figure 5:
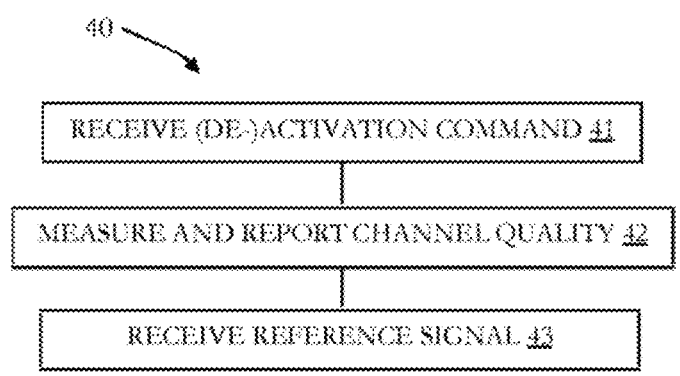
FIG. 5 illustrates a method to be performed by a user equipment.

In the following, a method 40 is discussed under reference of FIG. 5, which may be performed, in particular, by the circuitry of a UE as described herein.

At 41, a carrier segment activation command or deactivation command is received, as discussed above. The carrier segment activation command or the carrier segment deactivation command is received from the slave cell or the anchor base station, as discussed above.

At 42, a channel quality is measured and reported only on activated resource blocks, as discussed above.

At 43, a reference signal is only received on activated resource blocks, wherein the reference signal is specific for a group of UEs.

The order of features 41-43 may be different in different embodiments and can be chosen freely. Moreover, other embodiments of the method may only include a part of the features 41-43.

Figure 6:
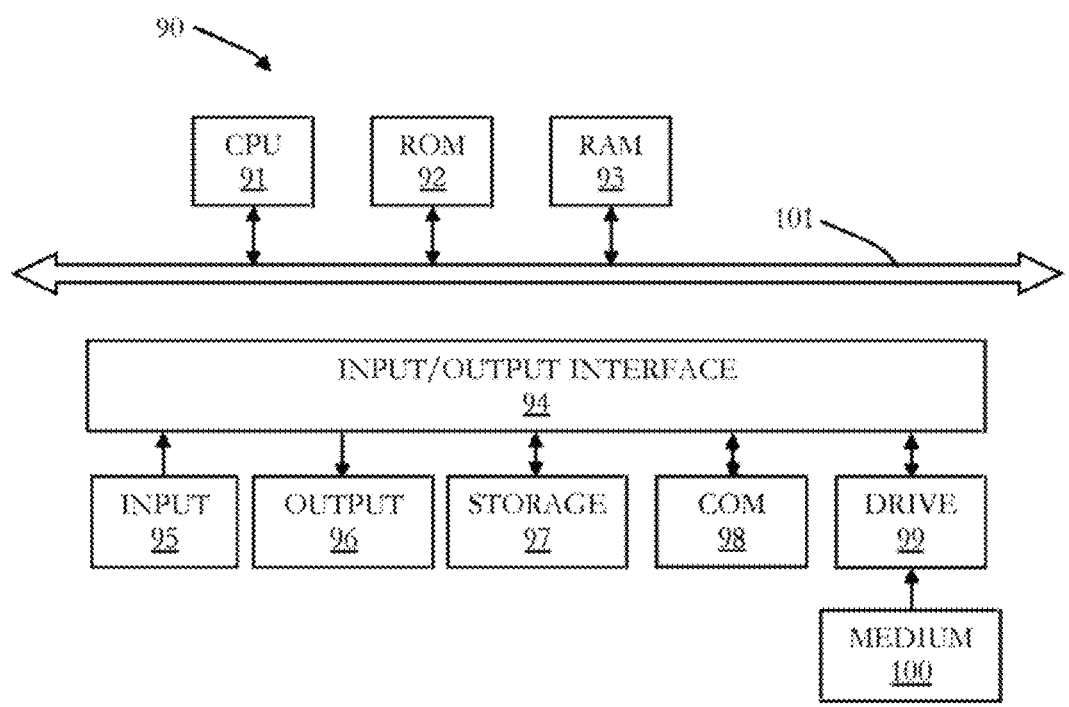
FIG. 6 shows a multi-purpose computer.

In the following, an embodiment of a general purpose computer 90 is described under reference of FIG. 6. The computer 90 can be such implemented that it can basically function as any type of (anchor, slave, etc.) base station, virtual/slave cell or user equipment as described herein. The computer has components 91 to 100, which can form a circuitry, such as anyone of the circuitries of the (anchor, slave) base station, virtual cell, slave cell, and user equipment, as described herein. Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which, in turn is connected to an input/output interface 94. The number of CPUs, memories and storages is only exemplary, and the skilled person will appreciate that the computer 90 can be adapted and configured accordingly for meeting specific requirements which arise, when it functions as a base station, virtual cell, and user equipment.

At the input/output interface 94 several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like. For example, the communication interface 98 may support other radio access technologies than the mentioned UMTS and LTE.

When the computer 90 functions as a base station the communication interface 98 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). The present disclosure is not limited to any particularities of such protocols.

Some embodiments of the present disclosure focus on the user centric operation in the network with virtual cells or, more generally, with slave cells. With some of the embodiments proposed herein, the user perceived quality of services may be improved. The whole network could provide more dynamic and efficient services to the end users, in some embodiments.

The methods as described herein are also implemented in some embodiments as a computer program causing a computer and/or a processor and/or a circuitry to perform the method, when being carried out on the computer and/or processor and/or the circuitry. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method features and an exemplary number of method features. The specific ordering of method features is however given for illustrative purposes only and should not be construed as binding. Such changes of the ordering of method features are apparent to the skilled person.

In so far as the embodiments of the disclosure described above are implemented, at least in part, using a software-controlled data processing apparatus, such as computer 90 above, it will be appreciated that a computer program providing such software control and a transmission, storage or other medium by which such a computer program is provided are envisaged as aspects of the present disclosure.

Note that the present technology can also be configured as described below.

(1) A mobile telecommunications system anchor base station for a mobile telecommunications system including at least one anchor cell and at least one slave cell being associated with the anchor cell, the anchor base station comprising circuitry being configured to:
  to activate or deactivate the slave cell, based on a service requirement received from at least one user equipment.

(2) The mobile telecommunications system anchor base station of (1), wherein the service requirement is received from a group of user equipments.

(3) The mobile telecommunications system anchor base station of (1) or (2), wherein the service requirement includes application level information.

(4) The mobile telecommunications system anchor base station of anyone of (1) to (3), wherein the circuitry is further configured to send a one-shot activation command.

(5) The mobile telecommunications system anchor base station of (4), wherein the circuitry is configured to send the one-shot activation command to the slave cell or a group of user equipments.

(6) The mobile telecommunications system anchor base station of anyone of (1) to (5), wherein the circuitry is further configured to activate or deactivate an extant carrier.

(7) The mobile telecommunications system anchor base station of (6), wherein the extant carrier is activated or deactivated for a single user equipment or a group of user equipments in the slave cell.

(8) The mobile telecommunications system anchor base station of anyone of (6) to (7), wherein the extant carrier includes a sporadic carrier.

(9) The mobile telecommunications system anchor base station of anyone of (6) to (8), wherein the extant carrier includes a carrier segment.

(10) The mobile telecommunications system anchor base station of anyone of (1) to (9), wherein the circuitry is further configured to select a coordinated set based on at least one of: link quality, matched service requirement, service provider, resources availability and interference level.

(11) The mobile telecommunications system anchor base station of anyone of (1) to (10), wherein the circuitry is further configured to perform handover on the basis of a relayed handover message being transmitted to the slave cell and being relayed by the slave cell.

(12) The mobile telecommunications system anchor base station of anyone of (1) to (11), wherein the slave cell is a virtual cell.

(13) A slave cell being established by a slave base station and being connected to an anchor base station in a mobile telecommunications system, the mobile telecommunications system comprising the anchor base station, the anchor base station being configured to communicate with at least one user equipment and at least one further slave cell, the at least one further slave cell being configured to communicate with at least one user equipment and the anchor base station, the slave cell comprising circuitry being configured to:
to activate or deactivate an extant carrier, based on a service requirement.

(14) The slave cell of (13), wherein the service requirement includes application level information.

(15) The slave cell of (13) or (14), wherein the extant carrier is activated or deactivated for a single user equipment or for a group of user equipments.

(16) The slave cell of anyone of (13) to (15), wherein the extant carrier includes a sporadic carrier.

(17) The slave cell of anyone of (13) to (16), wherein the extant carrier includes a carrier segment.

(18) The slave cell of (17), wherein the activated carrier segment is located within a primary carrier.

(19) The slave cell of (17) or (18), wherein the activated carrier segment is associated with a primary carrier.

(20) The slave cell of anyone of (13) to (19), wherein circuitry is further configured to send a reference signal on activated resource blocks to a specific user equipment or a group of user equipments.

(21) The slave cell of (20), wherein the circuitry is further configured to send the reference signal with a pre-defined periodicity.

(22) The slave cell of anyone of (13) to (21), wherein the circuitry is further configured to send a measurement configuration on activated resource blocks to a specific user equipment or a group of user equipments.

(23) The slave cell of anyone of (13) to (22), wherein activated resource blocks are at least one of: associated with a primary carrier, associated with an extant carrier, and located within a primary carrier.

(24) The slave cell of anyone of (13) to (23), wherein the circuitry is further configured to perform a control plane handover.

(25) The slave cell of anyone of (13) to (24), wherein the circuitry is further configured to relay a relay handover message received from the anchor base station.

(26) The slave cell of anyone of (13) to (25), wherein the circuitry is further configured to select another slave cell for handover on the basis of a measurement report received from a user equipment.

(27) A user equipment being connectable to at least one anchor base station and at least one slave cell of a mobile telecommunications system, the mobile telecommunications system comprising the anchor base station being configured to communicate with at least one user equipment and at least one slave cell, the at least one slave cell being established by a slave base station and being configured to communicate with at least one user equipment and the anchor base station, the user equipment comprising a circuitry being configured to:
receive a carrier segment activation command or deactivation command.

(28) The user equipment of (27), wherein the carrier segment activation command or the carrier segment deactivation command is received from the slave cell or the anchor base station.

(29) The user equipment of (27) or (28), wherein the circuitry is further configured to measure and report a channel quality only on activated resource blocks.

(30) The user equipment of anyone of (27) to (29), wherein the circuitry is further configured to receive a user equipment group specific reference signal only on activated resource blocks.

The invention claimed is:

1. A slave cell being established by a slave base station and being connected to an anchor base station in a mobile telecommunications system, the mobile telecommunications system comprising the anchor base station, the anchor base station being configured to communicate with at least one user equipment and at least one further slave cell, the at least one further slave cell being configured to communicate with at least one user equipment and the anchor base station, the slave cell comprising circuitry being configured to:
activate or deactivate a carrier segment located within a primary carrier, based on a service requirement requested by the at least one user equipment; and
perform a control plane handover.

2. The slave cell of claim 1, wherein the service requirement includes application level information.

3. The slave cell of claim 1, wherein the carrier segment is activated or deactivated for a single user equipment or for a group of user equipments.

4. The slave cell of claim 1, wherein circuitry is further configured to send a reference signal on activated resource blocks to a specific user equipment or a group of user equipments.

5. The slave cell of claim 4, wherein the circuitry is further configured to send the reference signal with a pre-defined periodicity.

6. The slave cell of claim 1, wherein the circuitry is further configured to send a measurement configuration on activated resource blocks to a specific user equipment or a group of user equipments.

7. The slave cell of claim 1, wherein activated resource blocks are located within a primary carrier.

8. The slave cell of claim 1, wherein the circuitry is further configured to relay a relay handover message received from the anchor base station.

9. The slave cell of claim 1, wherein the circuitry is further configured to deactivate any carrier segment not in use.

10. The slave cell of claim 1, wherein the circuitry is further configured to deactivate all carrier segments based on the service requirement.

11. A slave cell being established by a slave base station and being connected to an anchor base station in a mobile telecommunications system, the mobile telecommunications system comprising the anchor base station, the anchor base station being configured to communicate with at least one user equipment and at least one further slave cell, the at least one further slave cell being configured to communicate with at least one user equipment and the anchor base station, the slave cell comprising circuitry configured to:
- activate or deactivate a carrier segment located within a primary carrier, based on a service requirement requested by the at least one user equipment; and
- select another slave cell for handover on the basis of a measurement report received from a user equipment.

12. A user equipment being connectable to at least one anchor base station and at least one slave cell of a mobile telecommunications system, the mobile telecommunications system comprising the anchor base station being configured to communicate with at least one user equipment and at least one slave cell, the at least one slave cell being established by a slave base station and being configured to communicate with at least one user equipment and the anchor base station, the user equipment comprising a circuitry being configured to:
- send a service requirement to the at least one slave cell; and
- receive a carrier segment activation command or deactivation command from the at least one slave cell indicating an activated or deactivated carrier segment located within a primary carrier.

13. The user equipment of claim 12, wherein the carrier segment activation command or the carrier segment deactivation command is received from the slave cell or the anchor base station.

14. The user equipment of claim 12, wherein the circuitry is further configured to measure and report a channel quality only on activated resource blocks.

15. The user equipment of claim 12, wherein the circuitry is further configured to receive a user equipment group specific reference signal only on activated resource blocks.

16. The user equipment of claim 12, wherein any carrier segment not in use is deactivated.

17. The user equipment of claim 12, wherein all carrier segments are deactivated based on the service requirement.

* * * * *